W. B. BANFIELD.
EMERGENCY TIRE.
APPLICATION FILED SEPT. 8, 1920.

1,380,627.

Patented June 7, 1921.

INVENTOR
W. B. Banfield
BY
ATTYS

UNITED STATES PATENT OFFICE.

WILLIAM B. BANFIELD, OF WINNIPEG, MANITOBA, CANADA.

EMERGENCY-TIRE.

1,380,627.	Specification of Letters Patent.	Patented June 7, 1921.

Application filed September 8, 1920. Serial No. 408,793.

*To all whom it may concern:*

Be it known that I, WILLIAM B. BANFIELD, of the city of Winnipeg, in the Province of Manitoba, Canada, have invented certain new and useful Improvements in Emergency-Tires, of which the following is the specification.

The invention relates to improvements in emergency tires and the general object of the invention is to provide a tire which can be quickly placed on an automobile wheel in place of the ordinary pneumatic tire where the pneumatic tire has become punctured or otherwise rendered useless, the applied emergency tire permitting one to drive the car without injuring the wheel.

A further object of the invention is to construct the emergency tire in a cheap and durable manner and so that it can be tightly secured to the wheel rim and to arrange the said tire so that it can be coiled up to take but little room when not in use and accordingly conveniently stored.

With the above more important objects in view the invention consists essentially in the arrangement and construction of parts hereinafter more particularly described and later pointed out in the appended claims, reference being had to the accompanying drawing in which:—

In the drawing like characters of reference indicate corresponding parts in the several figures.

Figure 1:
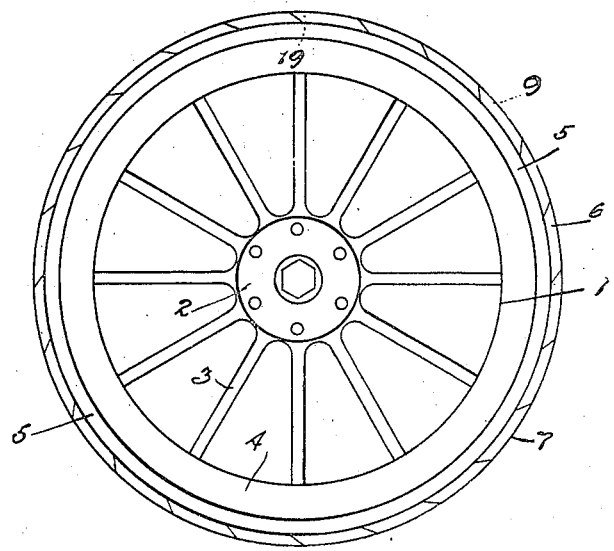
Figure 1 is a side view of a wheel with my emergency tire thereon.
Figure 2:
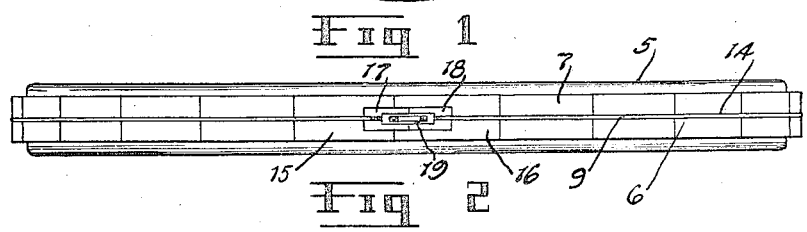
Fig. 2 is an enlarged plan view of the emergency tire on the wheel.
Figure 3:
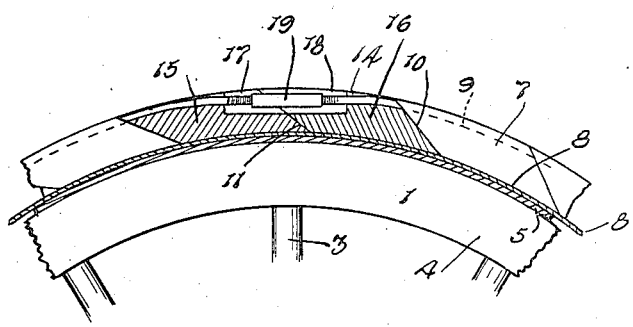
Fig. 3 is an enlarged detailed side view of several sections of the emergency tire, parts being broken away to expose construction.
Figure 4:
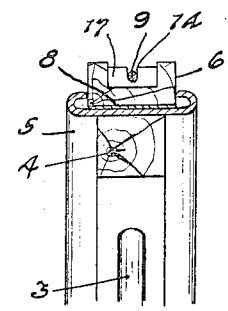
Fig. 4 is an enlarged detailed vertical cross sectional view through the tire and rim.

1 is the customary automobile wheel comprising the hub 2, spokes 3, felley 4 and rim 5. The rim of the wheel varies according to the type of car and in the present instance is shown as a channel rim, such being commonly found on Ford automobiles. The emergency tire which I supply is mounted on the rim 5 after the ordinary pneumatic tire has been removed, it being understood that the emergency tire is used in place of the pneumatic tire after the same has been punctured, blown out or otherwise rendered useless.

My tire 6 comprises a number of similarly constructed blocks or sections 7 secured to a flexible band 8 and demountably fastened to the rim by an adjustable clamping wire, cable or such like 9. The blocks or segments are of a width such that they just nicely fit between the flanges of the rim and of such a thickness that their exposed or tread faces are beyond the outer edges of the flanges, such arrangement protecting the rim flanges against contact with the roadway. The bodies of the blocks are curved concentric to the axle of the wheel so that their inner faces lie on the periphery of the rim and the ends of the blocks are cut at an angle as indicated at 10 and 11 so that the joints between blocks are what might be termed a lapped joint.

Figure 5:
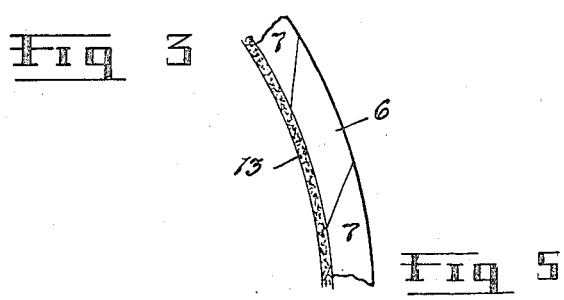
Fig. 5 is a side view of several sections showing a modified form of band.

When the blocks are assembled on the rim they entirely inclose it with their ends engaging and they are all attached such as by tacking to the flexible band 8. This band can be in the form of webbing elastic or non-elastic and where no resiliency is required or of rubber or such like resilient material as shown at 13 Fig. 5 where one desires to absorb a certain amount of the jar when traveling on the roadway.

All the blocks are centrally channeled on their tread faces to provide a continuous channel 14 passing around the emergency tire and adapted to receive the tie wire or cable 9 and the two end blocks indicated specifically at 15 and 16 are notched out at 17 and 18 to receive a turn buckle 19 adjustably connecting the two ends of the wire or cable. The notches simply allow of free turning of the turn buckle and serve as a pocket for the turn buckle within the tread face.

When one punctures the ordinary pneumatic tire he simply removes the said tire in the ordinary way and then takes my emergency tire and applies it on the rim between the channels passing it around the rim to inclose same. He then places the wire in the grooves and around the emergency tire, taking care that the turn buckle is brought to the pocket. Then, by tightening up the turn buckle, the wire is drawn tightly around the emergency tire and binds it tightly to the rim of the wheel.

One can then complete his journey with the emergency tire substituted for the punctured or blown out pneumatic tire.

I wish it here to be particularly noticed that this emergency tire can be very conveniently stored as the band allows the blocks to be coiled up spirally, thereby taking but little room. Obviously the blocks can be made from wood, composition or any material which will serve the purpose and they can be made to accommodate the existing type of rim on which they may be applied.

I have hereinbefore stated that the webbing can be elastic or non-elastic. Where non-elastic webbing is used a little difficulty would be experienced in placing the emergency tire on the rim but the work can however be accomplished if a little care is taken. Where an elastic webbing is used the work can be done much quicker as the emergency tire is placed on the rim from the side and the blocks are expanded over the flanges of the rim to take their place between the flanges. Obviously adjacent sections can draw apart owing to the elasticity of the elastic webbing. The elastic would naturally make the emergency tire somewhat more expensive and accordingly for the cheaper grades non-elastic webbing could be used.

What I claim as my invention is:—

1. A tire comprising a flexible band adapted to encircle the rim of a wheel, a plurality of abutting tread sections secured upon said band, said sections having the outer faces thereof grooved longitudinally to provide an encircling channel and certain of said sections having the abutting ends thereof recessed to conjointly provide a pocket communicating with said channel, a tie wire passing around the sections and contained within said channel and a tightening device connecting the ends of said wire and contained within said pocket.

2. A tire comprising a cushioning band adapted to encircle the rim of a wheel, a plurality of abutting tread sections secured upon said band and having the abutting faces thereof angularly disposed to the band and the rim of the wheel, said sections having the outer faces thereof grooved longitudinally to provide an encircling channel and certain of said sections having the abutting ends thereof recessed to conjointly provide a pocket communicating with said channel, a tie wire passing around the sections and contained within said channel and a tightening device connecting the ends of said wire and contained within said pocket.

Signed at Winnipeg, this 20th day of August 1920.

WILLIAM B. BANFIELD.

In the presence of—
 GERALD S. ROXBURGH,
 K. B. WAKEFIELD.